(12) United States Patent
Serrao et al.

(10) Patent No.: US 11,242,062 B2
(45) Date of Patent: Feb. 8, 2022

(54) ELECTRIC DRIVELINE AND METHOD OF SHIFTING GEARS

(71) Applicant: DANA ITALIA S.R.L., Trentino (IT)

(72) Inventors: Lorenzo Serrao, Torbole su Garda (IT); Matteo Grott, Via Lagarina (IT); Daniele Poletto, Riva del Garda (IT); Luca Balboni, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 16/962,799

(22) PCT Filed: Jan. 15, 2019

(86) PCT No.: PCT/EP2019/050961
§ 371 (c)(1),
(2) Date: Jul. 16, 2020

(87) PCT Pub. No.: WO2019/141684
PCT Pub. Date: Jul. 25, 2019

(65) Prior Publication Data
US 2021/0031774 A1    Feb. 4, 2021

(30) Foreign Application Priority Data

Jan. 17, 2018  (EP) .................................... 18425003

(51) Int. Cl.
*B60W 30/19*   (2012.01)
*B60W 10/08*   (2006.01)
(Continued)

(52) U.S. Cl.
CPC ............ *B60W 30/19* (2013.01); *B60W 10/08* (2013.01); *B60W 10/11* (2013.01); *F16H 3/08* (2013.01);
(Continued)

(58) Field of Classification Search
CPC ...... B60W 30/19; B60W 10/08; B60W 10/11; B60W 2710/081; B60W 2710/083;
(Continued)

(56) References Cited

U.S. PATENT DOCUMENTS

| | | | |
|---|---|---|---|
| 3,667,309 A | 6/1972 | Franz et al. | |
| 5,498,216 A | 3/1996 | Bitsche et al. | |
| 5,795,260 A * | 8/1998 | Kim | F16H 61/2807 477/20 |
| 5,951,436 A * | 9/1999 | Kim | B60L 15/2054 477/20 |

(Continued)

FOREIGN PATENT DOCUMENTS

| | | |
|---|---|---|
| CN | 102979862 A | 3/2013 |
| CN | 103298674 A | 9/2013 |

(Continued)

OTHER PUBLICATIONS

ISA European Patent Office, International Search Report Issued in Application No. PCT/EP2019/050961, dated Apr. 16, 2019, WIPO, 2 pages.
(Continued)

*Primary Examiner* — Justin Holmes
(74) *Attorney, Agent, or Firm* — McCoy Russell LLP

(57) ABSTRACT

An electric driveline comprising an electric drive motor and a transmission, and a method of shifting gears therefor. The transmission comprises an output shaft, a synchronizer, preferably a hydraulically actuatable synchronizer, for selectively drivingly engaging the electric drive motor with the output shaft via either one of a first gear providing a first gear ratio $\gamma_1$ between the electric drive motor and the output shaft, and a second gear providing a second gear ratio $\gamma_2$ between the electric drive motor and the output shaft, and an electronic shift controller for controlling a gear shift from the first gear to the second gear. The electronic shift controller is configured to actuate the synchronizer to disengage the first gear and to engage the second gear, and to synchronize a motor speed of the electric drive motor with a target speed.

16 Claims, 4 Drawing Sheets

(Downshift)

(51) Int. Cl.
*B60W 10/11* (2012.01)
*F16H 3/08* (2006.01)
*F16H 61/04* (2006.01)
*F16H 63/30* (2006.01)

(52) U.S. Cl.
CPC ..... *F16H 61/0403* (2013.01); *F16H 63/3023* (2013.01); *B60W 2710/081* (2013.01); *B60W 2710/083* (2013.01); *B60W 2710/1005* (2013.01); *B60Y 2200/91* (2013.01); *F16H 2061/0422* (2013.01); *F16H 2200/0021* (2013.01); *F16H 2200/0034* (2013.01); *F16H 2306/46* (2013.01); *F16H 2306/48* (2013.01); *F16H 2306/50* (2013.01)

(58) Field of Classification Search
CPC .............. B60W 2710/1005; F16H 3/08; F16H 61/0403; F16H 63/3023; F16H 2061/0422; F16H 2200/0021; F16H 2200/0034; F16H 2306/46; F16H 2306/48; F16H 2306/50; F16H 63/50; B60Y 2200/91
See application file for complete search history.

(56) References Cited

U.S. PATENT DOCUMENTS

| | | | |
|---|---|---|---|
| 6,126,570 | A | 10/2000 | Böhm et al. |
| 8,827,867 | B1* | 9/2014 | Simonini ................ F16H 61/04 |
| | | | 477/15 |
| 2017/0166208 | A1* | 6/2017 | Park ........................ F16H 61/04 |

FOREIGN PATENT DOCUMENTS

| | | |
|---|---|---|
| CN | 103851183 A | 6/2014 |
| CN | 106246902 A | 12/2016 |
| CN | 106870720 A | 6/2017 |
| EP | 1887261 A1 | 2/2008 |
| FR | 2946291 A1 | 12/2010 |
| WO | 2013072609 A1 | 5/2013 |

OTHER PUBLICATIONS

China National Intellectual Property Administration, Office Action and Search Report Issued in Application No. 201980008893.5, dated Jul. 23, 2021, 13 pages.

* cited by examiner

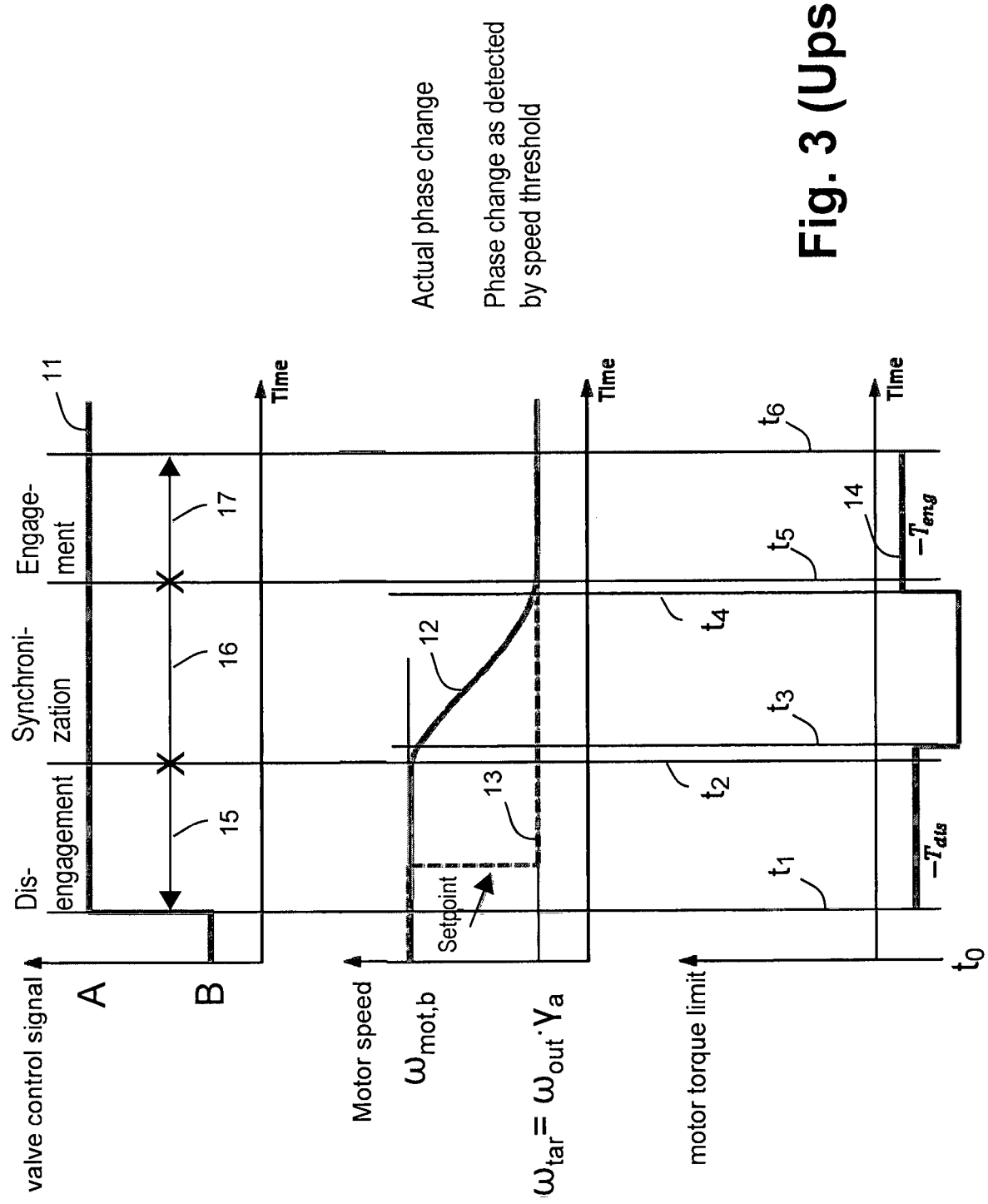
Fig. 3 (Upshift)

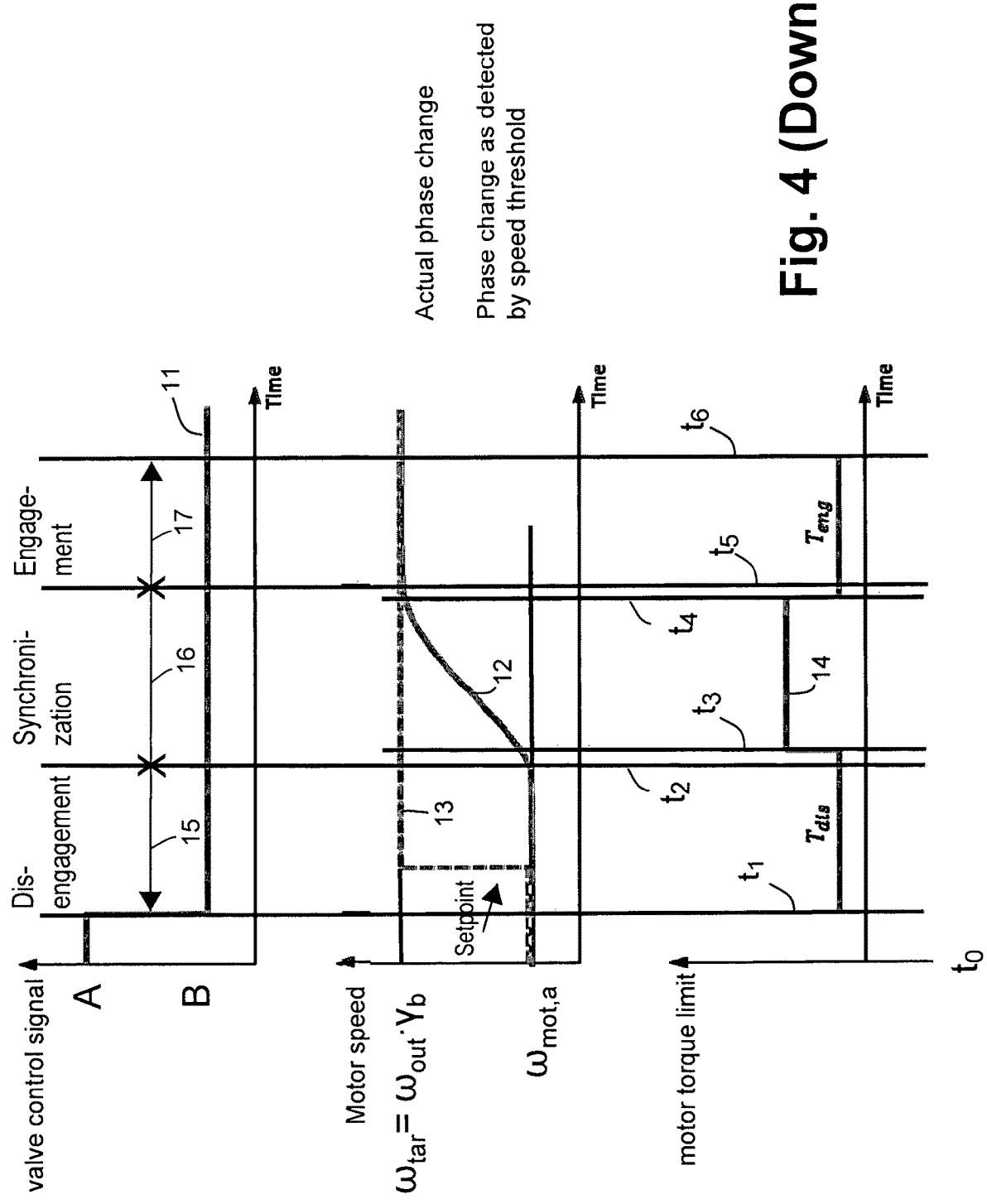
Fig. 4 (Downshift)

ELECTRIC DRIVELINE AND METHOD OF SHIFTING GEARS

CROSS-REFERENCE TO RELATED APPLICATION(S)

The present application is a U.S. National Phase of International Patent Application Serial No. PCT/EP2019/050961, entitled "ELECTRIC DRIVELINE AND METHOD OF SHIFTING GEARS," filed on Jan. 15, 2019. International Patent Application Serial No. PCT/EP2019/050961 claims priority to European Patent Application No. 18425003.3, filed on Jan. 17, 2018. The entire contents of each of the above-mentioned applications are hereby incorporated by reference in their entirety for all purposes.

TECHNICAL FIELD

The present disclosure relates to an electric driveline and to a method of shifting gears of an electric driveline. Electric drivelines of the presently proposed type may find application in off-highway vehicles such as tractors, earth moving vehicles, material handling vehicles, mining vehicles and the like.

BACKGROUND AND SUMMARY

Drivelines for automotive vehicles are typically equipped with a transmission configured to transmit a torque provided by a power source such as an internal combustion engine to a vehicle output. The vehicle output may comprise a ground engaging structure including one or more vehicle wheels, for example. Usually, the transmission comprises a plurality of shafts and gears and allows changing a gear ratio between the power source and the vehicle output by selectively engaging different gears for transmitting torque from the power source to the vehicle output.

However, a gear shift often includes engaging and disengaging gears and shafts that rotate at different speeds, that are subject to different driving torques or that are coupled to different mechanical loads. Consequently, a gear shift may cause a high degree of wear in the transmission and may imperil the operability of the driveline due extended periods of reduced torque transmission or due to mechanical jerks that may occur when gears and shafts rotating at different speeds are engaged or disengaged.

Thus, a problem addressed by embodiments described herein comprises designing a driveline that preferably reduces mechanical wear and that preferably improves the operability of the driveline during a gear shift. Furthermore, costs for producing and maintaining the driveline should be preferably low. A further problem addressed by embodiments described herein comprises devising a method of shifting gears in said driveline.

These and other problems are addressed by the embodiments described herein comprising an electric driveline and a method of shifting gears of an electric driveline.

The presently proposed electric driveline, in particular for use in a vehicle such as in an off-highway vehicle, comprises:
an electric drive motor; and
a transmission, the transmission comprising:
an output shaft, and
a synchronizer, preferably a hydraulically actuatable synchronizer, for selectively drivingly engaging the electric drive motor with the output shaft via either one of a first gear providing a first gear ratio $\gamma_1$ between the electric drive motor and the output shaft, and a second gear providing a second gear ratio $\gamma_2$ between the electric drive motor and the output shaft; and
an electronic shift controller for controlling a gear shift from the first gear to the second gear;
wherein the electronic shift controller is configured to:
actuate the synchronizer to disengage the first gear and to engage the second gear, and
synchronize a motor speed of the electric drive motor with a target speed.

Synchronizing the motor speed with the target speed during the shifting procedure guarantees a particularly fast and smooth shift, thereby improving operability of the driveline and minimizing wear of driveline components. Hydraulically actuatable synchronizers operate particularly reliably over long operation periods and may be manufactured and maintained at low cost.

In the following, the process of disengaging the first gear may be referred to as the disengagement phase. The process of synchronizing the motor speed with the target speed may be referred to as the synchronization phase. And the process of engaging the second gear may be referred to as the engagement phase.

Typically, the electronic shift controller is configured to synchronize the motor speed with the target speed after the first gear has been disengaged and before engagement of the second gear is initiated. That is, usually the driveline is in a neutral gear and the electric drive motor is not engaged with the output shaft during the synchronization phase. The driveline may further comprise a ground engaging structure such as one or more wheels. The output shaft may then be drivingly engaged or selectively drivingly engaged with said ground engaging structure.

The transmission may further comprise an input shaft drivingly engaged with the electric drive motor and selectively drivingly engaged with the output shaft via one of the first gear and the second gear. When the electric drive motor is drivingly engaged with the output shaft, the gear ratio $\gamma$ between the electric drive motor and the output shaft is given by $\gamma = \omega_{mot}/\omega_{out}$, wherein $\omega_{mot}$ is the rotational speed of the electric drive motor and wherein $\omega_{out}$ is the rotational speed of the output shaft.

The electronic shift controller may be configured to determine the target speed of the motor based on the output shaft speed $\omega_{out}$ and based on the second gear ratio $\gamma_2$. For example, the target speed $\omega_{tar}$ may be given by $\omega_{tar} = \omega_{out} \cdot \gamma_2$. That is, the target speed is typically given by the rotational speed of the electric drive motor after the shift has been completed. The electronic shift controller may be configured to synchronize the motor speed with the target speed by executing a control algorithm such as a feedback control algorithm.

The synchronizer may be a hydraulically actuatable synchronizer comprising a hydraulic actuator such as a hydraulic cylinder. For example, the transmission may comprise a transmission shaft on which the first gear and the second gear are disposed. The transmission shaft may be identical with the input shaft or with the output shaft, or the transmission shaft may be different from the input shaft and the output shaft. The hydraulic actuator may then be configured to selectively drivingly engage either one of the first gear and the second gear with the transmission shaft. For instance, the hydraulically actuatable synchronizer may include a movable member such as a shift collar movably disposed on the transmission shaft and configured to selectively drivingly engage either one of the first gear and the second gear with the transmission shaft. The hydraulic actuator may then be coupled with the movable member for moving the movable member relative to the transmission shaft. And the hydraulically actuatable synchronizer may further comprise a control valve for controlling the hydraulic actuator. For example, the electronic shift controller may be configured to actuate the synchronizer to disengage the first gear and/or to engage the second gear by changing a control position of the control valve.

In order to facilitate the disengagement of the first gear and to minimize mechanical wear of the first gear and of the synchronizer, the electronic shift controller may be configured to limit an absolute value $|T_{mot}|$ of a torque provided by the electric drive motor during the disengagement phase to a first maximum torque $|T_{dis}|$ until the first gear has been disengaged, so that $|T_{mot}| \leq |T_{dis}|$ during the disengagement phase, preferably throughout the disengagement phase. The first maximum torque $|T_{dis}|$ may be the maximum torque that allows disengagement of the first gear. Preferably, $|T_{dis}|>0$. Also, the electronic shift controller may be configured to control the electric drive motor such that the electric drive motor provides a non-zero torque $|T_{mot}|>0$ during the disengagement phase or throughout the disengagement phase. This may accelerate the subsequent synchronization process, for example.

At the same time, in order to speed up the synchronization phase it is usually preferable to exert the maximum tolerable amount of torque on the first gear during the disengagement phase. To that end, the electronic shift controller may be configured to set the absolute value $|T_{mot}|$ of the torque provided by the electric drive motor during the disengagement phase to the maximum torque $|T_{dis}|$ until the first gear is disengaged, so that $|T_{mot}|=|T_{dis}|$ during the disengagement phase, preferably throughout the disengagement phase.

Depending on the mechanism of the synchronizer or of the hydraulically actuatable synchronizer, it may be difficult to predetermine the exact point in time at which the synchronizer starts engaging the second gear. Thus, an excess torque provided by the electric drive motor during the synchronization phase may possibly result, during the subsequent engagement of the second gear, in: wear of a lining material of the synchronizer; burning of the lining material; irreversible locking and possibly breakage of the connecting elements; rattling during the last part of the engagement phase with damage of the synchronizer teeth profile.

Therefore, in order to facilitate the engagement of the second gear and to minimize mechanical wear to avoid the above risks, the electronic shift controller may be configured to limit an absolute value $|T_{mot}|$ of a torque provided by the electric drive motor during the synchronization phase to a second maximum torque $|T_{sync}|$ until the motor speed has been synchronized with the target speed, so that $|T_{mot}| \leq |T_{sync}|$ during the synchronization phase, preferably throughout the synchronization phase. Preferably, $|T_{sync}|>0$. Or in other words, the electronic shift controller may be configured to control the electric drive motor such that the electric drive motor provides a non-zero torque $|T_{mot}|>0$ during the synchronization phase or throughout the synchronization phase, for example in order to accelerate or to decelerate the electric drive motor.

And similarly, in order to facilitate the engagement of the second gear and to avoid locking of the engagement mechanism and possibly breakage of components or rattling with a synchronizer teeth profile, the electronic shift controller may be configured to limit an absolute value $|T_{mot}|$ of a torque provided by the electric drive motor during engagement of the second gear to a third maximum torque $|T_{eng}|$ until the second gear is engaged, so that $|T_{mot}| \leq |T_{eng}|$ during the engagement phase, preferably throughout the engagement phase. The third maximum torque $|T_{eng}|$ may be the maximum torque that allows engagement of the second gear. Preferably, $|T_{eng}|>0$. Or in other words, $|T_{eng}|$ may be non-zero. Specifically, the electronic shift controller may be configured to control the electric drive motor such that the electric drive motor provides a non-zero torque $|T_{mot}|>0$ during the engagement phase or throughout the engagement phase. Preferably, the second maximum torque $|T_{sync}|$ to which the motor torque may be limited during the synchronization phase is equal to or larger than the third maximum torque $|T_{eng}|$ to which the motor torque may be limited during the engagement phase. However, it is likewise conceivable that $|T_{sync}|$ is smaller than or equal to $|T_{eng}|$, i.e. it is conceivable that $|T_{sync}| \leq |T_{eng}|$.

During the disengagement phase and before disengagement of the first gear, the relation between the motor speed $\omega_{mot}$ and the output shaft speed $\omega_{out}$ is given by $\omega_{mot}=\omega_{out}\cdot\gamma_1$. However, disengagement of the first gear typically results in an abrupt deviation of the motor speed $\omega_{mot}$ from $\omega_{out}\cdot\gamma_1$. Therefore, the electronic shift controller may be configured to determine a point in time at which the first gear has been disengaged and/or at which the limitation of the absolute value $|T_{mot}|$ of the torque provided by the electric drive motor to the second maximum torque $|T_{sync}|$ may be initiated based on the motor speed and based on the output shaft speed, for example as the point in time at which $|\omega_{mot}-\omega_{out}\cdot\gamma_1|>d_1$, wherein $d_1$ may be a first predetermined threshold.

Similarly, the electronic shift controller may be configured to determine a point in time at which the motor speed has been synchronized with the target speed and/or at which the limitation of the absolute value $|T_{mot}|$ of the torque provided by the electric drive motor to the third maximum torque $|T_{eng}|$ may be initiated based on the motor speed and based on the output shaft speed, for example as the point in time at which $|\omega_{mot}-\omega_{out}\cdot\gamma_2|<d_2$, wherein $d_2$ may be a second predetermined threshold.

The shift from the first gear to the second gear may be an upshift, as defined by the relation $\gamma_1>\gamma_2$. In this case the electronic shift controller may be configured to synchronize the motor speed with the target speed by controlling the electric drive motor to apply a negative torque on the input shaft to decelerate the motor speed. Or in other words, when the shift from the first gear to the second gear is an upshift, the electronic shift controller may be configured to reduce the output torque of the electronic drive motor during the synchronization phase. Alternatively, the shift from the first gear to the second gear may be a downshift, as defined by the relation $\gamma_1<\gamma_2$. In this case the electronic shift controller may be configured to synchronize the motor speed with the target speed by controlling the electric drive motor to apply a positive torque on the input shaft to accelerate the motor speed. Or in other words, when the shift from the first gear to the second gear is a downshift, the electronic shift controller may be configured to increase the output torque of the electronic drive motor during the synchronization phase. In both cases (upshift and downshift) the output torque the electric drive motor exerts on the input shaft of the transmission during the synchronization phase preferably always acts such as to minimize the absolute value of the difference between the motor speed $\omega_{mot}$ and $\omega_{tar}=\omega_{out}\cdot\gamma_2$, i.e. such as to minimize the term $|\omega_{mot}-\omega_{out}\cdot\gamma_2|$.

And the presently proposed method of shifting gears in the electric driveline defined above comprises the steps of:

actuating the synchronizer to disengage the first gear and to engage the second gear, and synchronizing the motor speed of the electric drive motor with the target speed.

The method may further include at least one or more of the following steps:

(i) during the step of disengaging the first gear, limiting an absolute value $|T_{mot}|$ of a torque provided by the electric drive motor to a first maximum torque $|T_{dis}|$ and optionally controlling the electric drive motor (2) to provide a non-zero torque $|T_{mot}|>0$, until the first gear is disengaged, so that $|T_{mot}| \leq |T_{dis}|$ during disengagement of the first gear, wherein the first maximum torque $|T_{dis}|$ is preferably non-zero and may be the maximum torque that allows disengagement of the first gear;

(ii) during the step of synchronizing the motor speed with the target speed, limiting an absolute value $|T_{mot}|$ of a torque provided by the electric drive motor to a second maximum torque $|T_{sync}|$, wherein $|T_{sync}|$ is preferably non-zero, and optionally controlling the electric drive motor (2) to provide a non-zero torque $|T_{mot}|>0$, until the motor speed has been synchronized with the target speed, so that $|T_{mot}| \leq |T_{sync}|$ during synchronization of the motor speed with the target speed; and (iii) during the step of engaging the second gear, limiting an absolute value $|T_{mot}|$ of a torque provided by the electric drive motor to a third maximum torque $|T_{eng}|$ and optionally controlling the electric drive motor (2) to provide a non-zero torque $|T_{mot}|>0$, until the second gear is engaged, so that $|T_{mot}| \leq |T_{eng}|$ during engagement of the second gear, wherein the third maximum torque $|T_{eng}|$ is preferably non-zero and may be the maximum torque that allows engagement of the second gear.

The step of limiting the absolute value $|T_{mot}|$ of the torque provided by the electric drive motor to the first maximum torque $|T_{dis}|$ may further include setting the absolute value $|T_{mot}|$ of the torque provided by the electric drive motor to the maximum torque $|T_{dis}|$ until the first gear is disengaged, so that $|T_{mot}|=|T_{dis}|$ during disengagement of the first gear.

When the shift from the first gear to the second gear is an upshift ($\gamma_1 > \gamma_2$), the step of synchronizing the motor speed with the target speed may include controlling the electric drive motor to apply a negative torque on the input shaft to decelerate the motor speed. And when the shift from the first gear to the second gear is a downshift ($\gamma_1 < \gamma_2$), the step of synchronizing the motor speed with the target speed may include controlling the electric drive motor to apply a negative torque on the input shaft to decelerate the motor speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Embodiments of the invention are described in the following detailed description and are depicted in the accompanying drawing in which:

FIG. 3 shows time traces of shift control parameters during an upshift; and

FIG. 4 shows time traces of shift control parameters during a downshift.

DETAILED DESCRIPTION

Figure 1:
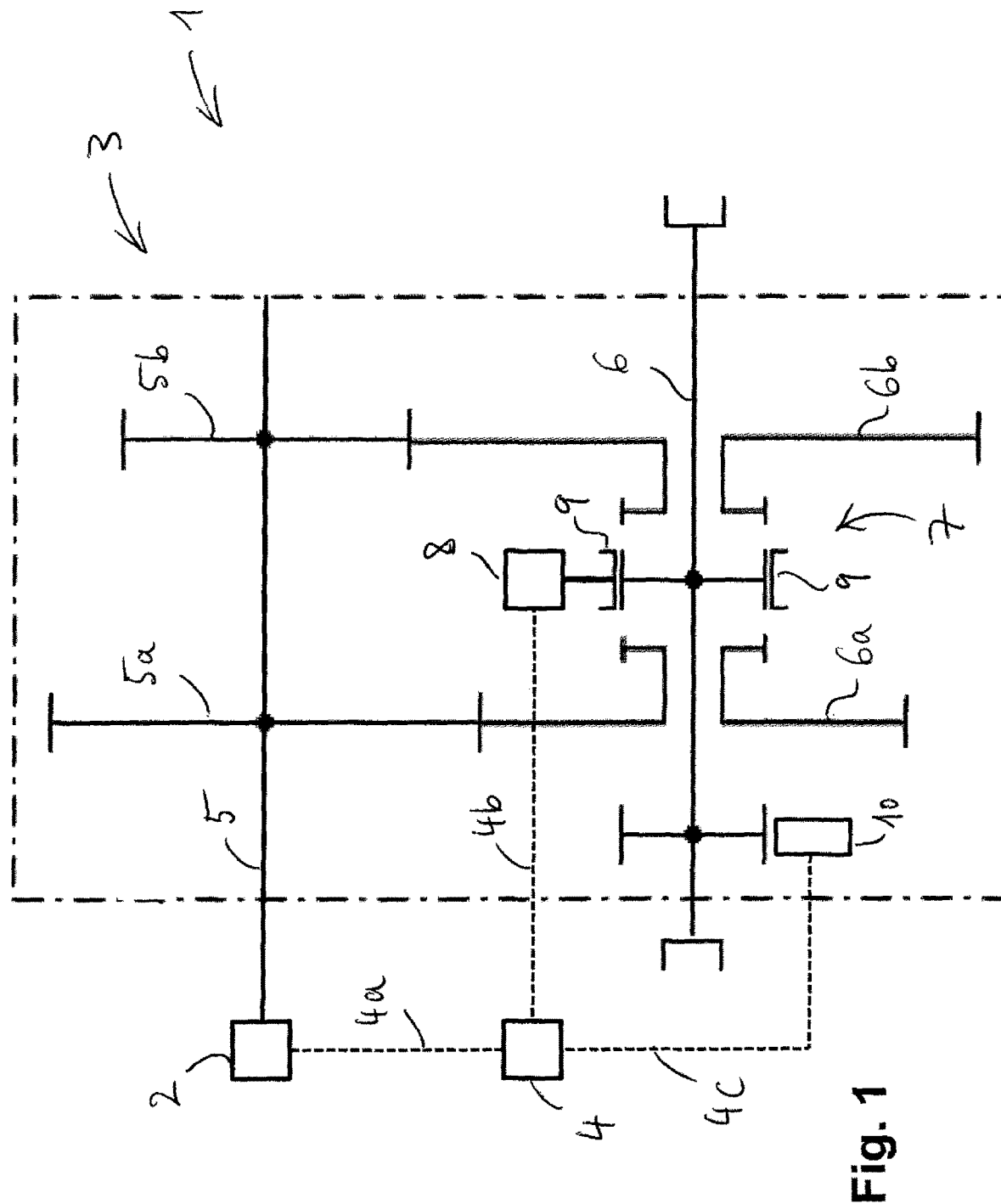
FIG. 1 shows a schematic of an embodiment of an electric driveline comprising a two-speed transmission with a hydraulically actuatable synchronizer.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows a schematic of an electric driveline 1 according to the invention. The driveline 1 comprises an electric drive motor 2, a transmission 3 and an electronic transmission controller 4 configured to control the motor 2 and the transmission 3.

The transmission 3 comprises an input shaft 5 drivingly engaged or selectively drivingly engaged with the motor 2 and an output shaft 6. It is understood that in variations of the embodiment depicted in FIG. 1 the input shaft 5 may be drivingly engaged or selectively drivingly engaged with the motor 2 via one or more intermediate shafts and a plurality of intermediate gears. The output shaft 6 may be drivingly engaged or selectively drivingly engaged with a ground engaging structure which may comprise one or more vehicle wheels, for example. The transmission 3 comprises gears 5a and 5b fixedly disposed on the input shaft 5 so that the gears 5a and 5b rotate with the input shaft 5 at all times. A radius and diameter of the gear 5a are larger than a radius and diameter of the gear 5b. And the transmission 3 comprises a high range gear 6a and a low range gear 6b that are rotatably disposed on the output shaft 6. The high range gear 6a is drivingly engaged or in mesh with the gear 5a, and the low range gear 6b is drivingly engaged or in mesh with the gear 5b. A radius and diameter of the high range gear 6a are smaller than a radius and diameter of the low range gear 6b.

Figure 2:
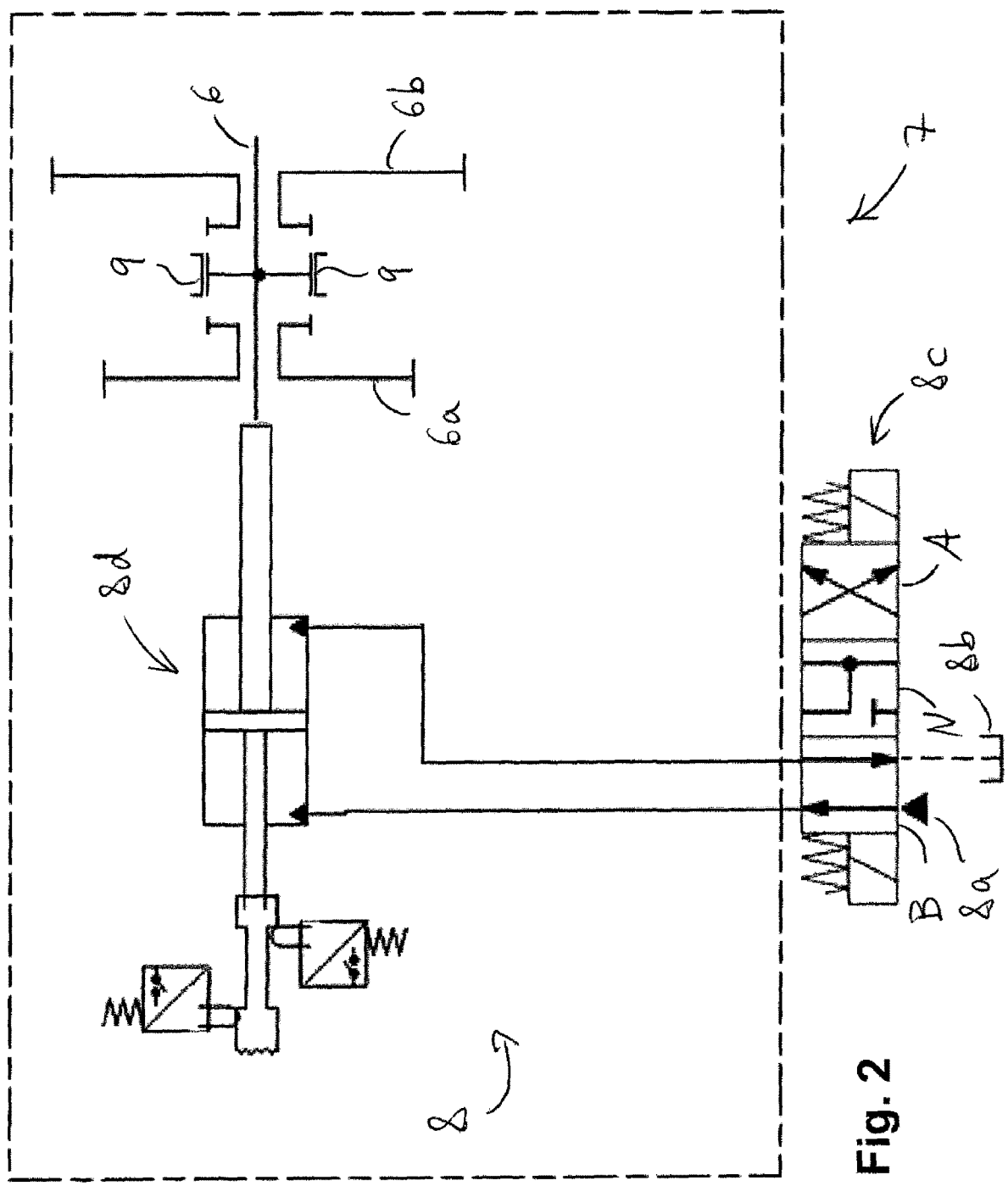
FIG. 2 shows a schematic of a detailed view of the hydraulically actuatable synchronizer of FIG. 1.

The transmission 3 further comprises a synchronizer 7. In the embodiment depicted in FIG. 1 the synchronizer 7 is configured as a hydraulically actuatable synchronizer including a hydraulic unit 8 for actuating a movable member 9 by means of hydraulic forces. A more detailed view of the hydraulic unit 8 is depicted in FIG. 2 and described further below. It is understood that in variations of the embodiment depicted in FIG. 1 the transmission 3 may comprise further gears and/or shafts configured to selectively provide further gear ratios between the motor 2 and the output shaft 6.

The hydraulic unit 8 is configured to move the movable member 9 relative to the output shaft 6 to selectively drivingly engage the motor 2 with the output shaft 6 via either one of the high range gear 6a and the low range gear 6b. For example, the synchronizer 7 may comprise a synchromesh unit and the movable member 9 may be configured as a movable shift collar configured to selectively frictionally engage with either one of the high range gear 6a and the low range gear 6b, and configured to selectively lock either one of the high range gear 6a and the low range gear 6b to the output shaft 6 so that either one of the high range gear 6a and the low range gear 6b may selectively rotate with the output shaft 6, respectively. Synchromesh units of this type are generally known in the art of automotive transmissions. It is understood that in variations of the embodiment depicted in FIG. 1 the synchronizer 7 may be configured as an electrically actuatable synchronizer including an electric actuator for moving the movable member 9, rather than the hydraulic unit 8 depicted in FIG. 1.

When the motor 2 is drivingly engaged with the output shaft 6, the gear ratio γ between the motor 2 and the output shaft 6 is generally defined as $\gamma=\omega_{mot}/\omega_{out}$, wherein $\omega_{mot}$ is the rotational speed of the electric drive motor and wherein $\omega_{out}$ is the rotational speed of the output shaft. When the movable member 9 locks the high range gear 6a to the output shaft 6, the output shaft 6 and the motor 2 are drivingly engaged via the high range gear 6a and the gear 5a, thereby providing a gear ratio $\gamma_a$ between the motor 2 and the output shaft 6. And when the movable member 9 locks the low range gear 6b to the output shaft 6, the output shaft 6 and the motor 2 are drivingly engaged via the low range gear 6b and the gear 5b, thereby providing a gear ratio $\gamma_b$ between the motor 2 and the output shaft 6.

In the embodiment shown in FIG. 1 the gears 5a, 5b, 6a, 6b are dimensioned such that $\gamma_a<\gamma_b$. That is, given a motor speed $\omega_{mot}$ and a motor output torque $T_{mot}$, engaging the high range gear 6a with the output shaft 6 provides a high output shaft speed $\omega_{out,a}=\omega_{mot}/\gamma_a$ and a low output shaft torque $T_{out,a}=T_{mot}\cdot\gamma_a$. And given the same motor speed $\omega_{mot}$ and the same motor output torque $T_{mot}$, engaging the low range gear 6b with the output shaft 6 provides a low output shaft speed $\omega_{out,b}=\omega_{mot}/\gamma_b$ and a high output shaft torque $T_{out,b}=T_{mot}\cdot\gamma_b$, wherein $\omega_{out,a}>\omega_{out,b}$ and wherein $T_{out,a}<T_{out,b}$.

The transmission 3 further includes a speed sensor 10 configured to measure a rotational speed of the output shaft 6. The electric drive motor 2, the hydraulic unit 8 and the speed sensor 10 are connected with the controller 4 via wired or wireless connections 4a-c. The controller 4 is configured to actuate the synchronizer 7, for example based on at least one of the motor speed $\omega_{mot}$, the motor torque $T_{mot}$, the output shaft speed $\omega_{out}$ and an engagement position of the movable member 9. And the controller 4 is configured to control the motor speed $\omega_{mot}$ and/or the motor torque $T_{mot}$, for example based on at least one of the motor speed $\omega_{mot}$, the motor torque $T_{mot}$, the output shaft speed $\omega_{out}$ and an engagement position of the movable member 9.

FIG. 2 shows a schematic of the hydraulically actuatable synchronizer 7 including a detailed view of the hydraulic unit 8. Here and in the following recurring features are designated with the same reference signs. The hydraulic unit 8 includes a high pressure source 8a such as a hydraulic pump, a low pressure tank 8b, an electrically controllable 4/3-way control valve 8c and a hydraulic actuator 8d such as a hydraulic cylinder coupled to the movable member 9 of the synchronizer 7. The valve 8c has control positions A, B and N. The controller 4 is configured to selectively switch the valve 8c to either one of the control positions A, B by controlling an electrical current in one or more solenoids.

Depending on the control position of the valve 8c, the hydraulic actuator 8d may selectively move the movable member 9 in either one of two directions, for example in either one of two directions along the output shaft 6, to selectively engage either one of the high range gear 6a and the low range gear 6b with the output shaft 6. When the valve 8c is switched to control position A, the hydraulic actuator 8d moves the movable member 9 toward engagement with the high range gear 6a (i. e. toward the left in FIG. 2). When the valve 8c is switched to control position B as shown in FIG. 2, the hydraulic actuator 8d moves the movable member 9 toward engagement with the low range gear 6b (i. e. toward the right in FIG. 2).

FIGS. 3 and 4 illustrate steps of a method of shifting gears in the electric driveline 1 of FIG. 1. Specifically, FIG. 3 shows time traces of a set of control parameters during an upshift from the low range gear 6b to the high range gear 6a. And FIG. 4 shows time traces of the same set of control parameters during a downshift from the high range gear 6a to the low range gear 6b. In particular, FIGS. 3 and 4 each show time traces of a valve control signal 11, of a motor speed 12, of a motor speed setpoint 13, and of a motor torque limit 14. The values "A" and "B" of the valve control signal 11 in FIGS. 3 and 4 correspond with the control positions A and B of the control valve 8c as depicted in FIG. 2, respectively. That is, when the valve control signal 11 takes on the value "A" the valve 8c is switched to the control position A, and when the valve control signal 11 takes on the value "B" the valve 8c is switched to the control position B.

The following is a description of the method steps carried out during the upshift from the low range gear 6b to the high range gear 6a depicted in FIG. 3.

At time $t_0$ the valve 8c is switched to the control position B and the synchronizer 7 locks the low range gear 6b to the output shaft 6 so that the low range gear 6b rotates with the output shaft 6. The gear ratio between the motor 2 and the output shaft 6 is given by $\gamma_b$. The high range gear 6a is free to rotate relative to the output shaft 6. The motor 2 turns at motor speed $\omega_{mot,b}$.

At time $t_1$ ($t_1>t_0$) the controller 4 initiates the upshift from the low range gear 6b to the high range gear 6a by switching the control valve 8c to the control position A, thereby causing the synchronizer 7 including the actuator 8d to gradually disengage the low range gear 6b. Time $t_1$ marks the beginning of a disengagement phase 15. The controller 4 may initiate the upshift at time $t_1$ based on at least one of an input command provided by an operator, a current motor speed and a current motor torque, for example. At the beginning of the disengagement phase 15 at time $t_1$ the controller 4 further sets the motor torque limit 14 to a lower limit of $-T_{dis}$, thereby limiting the torque exerted by the motor 2 to values $T_{mot}\geq-T_{dis}$ or $|T_{mot}|\leq|T_{dis}|$. $|T_{dis}|$ may be the maximum torque the motor 2 may exert during disengagement of the low range gear 6b without causing a torque or stress exerted on the low range gear 6b and/or on the synchronizer 7 to exceed a predetermined threshold torque, thereby guaranteeing a smooth disengagement of the low range gear 6b. Preferably, $|T_{dis}|$ is non-zero, i. e. $|T_{dis}|>0$, and the controller 4 may control the electric drive motor 2 to provide a non-zero torque $|T_{mot}|>0$ during the disengagement phase or throughout the disengagement phase.

During the disengagement phase 15 the controller 4 determines an updated value of the motor speed setpoint 13, also termed target speed $\omega_{tar}$, based on a current speed $\omega_{out}$ of the output shaft 6 measured by the speed sensor 10 and based on the gear ratio $\gamma_a$ provided by the high range gear 6a after completion of the upshift to the high range gear 6a.

Specifically, the target speed determined by the controller 4 is given by $\omega_{tar}=\gamma_a \cdot \omega_{out}$. When the motor speed setpoint is set to $\omega_{tar}$, the controller 4 starts synchronizing the motor speed $\omega_{mot}$ with the previously calculated target speed $\omega_{tar}=\gamma_a \cdot \omega_{out}$ by actively controlling the motor torque $T_{mot}$ and/or the motor speed $\omega_{mot}$. However, the motor speed starts to change only once the disengagement phase has been completed at time $t_2$. Updating the motor speed setpoint 13 before the disengagement phase 15 has been completed allows making the motor speed variation happen right upon completion of the disengagement phase.

At time $t_2$ ($t_2 > t_1$) the synchronizer 7 has fully disengaged the low range gear 6b from the output shaft 6. Time $t_2$ marks the beginning of a synchronization phase 16. During the synchronization phase 16 both the low range gear 6b and the high range gear 6a are disengaged from the output shaft 6 and free to rotate relative to the output shaft 6. At the beginning of the synchronization phase 16 at time $t_2$ the motor speed starts to change under the effect of the synchronizer friction torque and of the motor torque $T_{mot}$, thereby speeding up the synchronization process and reducing wear of the synchronizer 7 and/or the of high range gear 6a. The controller 4 may be configured to continuously update the value of the target speed $\omega_{tar}=\gamma_a \cdot \omega_{out}$ during the synchronization phase 16 based on continuous measurements of the speed $\omega_{out}$ of the output shaft 6 using the speed sensor 10.

During the synchronization phase 16 or throughout the synchronization phase 16 the controller 4 controls the motor 2 to exert or apply a non-zero torque on the input shaft 5, in particular a negative torque, resulting in a deceleration of the motor 2. Or in other words, during the synchronization phase 16 the controller 4 controls the motor 2 to reduce the absolute value of the difference between the motor speed $\omega_{mot}$ and the target speed $\omega_{tar}=\gamma_a \cdot \omega_{out}$. The controller 4 may synchronize the motor speed $\omega_{mot}$ with the target speed $\omega_{tar}=\gamma_a \cdot \omega_{out}$ using closed loop (feedback) control, for example.

At time $t_3$ ($t_3 > t_2$) the controller 4 determines that $|\omega_{mot} - \omega_{out} \gamma_b| > d_1$, indicating that the low range gear 6b has been disengaged from the output shaft 6. $d_1$ may be a predetermined threshold value, for example. At time $t_3$ the controller 4 then sets the motor torque limit 14 to a lower limit of $-T_{sync}$, thereby limiting the torque exerted by the motor 2 to values $T_{mot} \geq -T_{sync}$ or $|T_{mot}| \leq |T_{sync}|$. Preferably, $|T_{sync}| > 0$. Limiting the motor torque during the synchronization phase 16 may reduce a torque or stress exerted on the high range gear 6a and/or on the synchronizer when the synchronizer 7 starts engaging the high range gear 6a.

At time $t_4$ ($t_4 > t_3$) the controller 4 determines that $|\omega_{mot} - \omega_{out} \gamma_a| < d_2$, indicating that the motor speed $\omega_{mot}$ has been synchronized with the target speed $\omega_{tar}=\gamma_a \cdot \omega_{out}$ and that the synchronizer 7 including the hydraulic actuator 8d is about to engage the high range gear 6a with the output shaft 6. $d_2$ may be a predetermined threshold value, for example. At time $t_4$ the controller 4 then sets the motor torque limit 14 to a lower limit of $-T_{eng}$, thereby limiting the torque exerted by the motor 2 to values $T_{mot} \geq -T_{eng}$ or $|T_{mot}| \leq |T_{eng}|$. Preferably, $|T_{eng}|$ is non-zero, i. e. $|T_{eng}| > 0$, and the controller 4 may control the electric drive motor 2 to provide a non-zero torque $|T_{mot}| > 0$ during the engagement phase or throughout the engagement phase. Limiting the motor torque before the synchronizer 7 starts engaging the high range gear 6a with the output shaft 6 may reduce a torque or stress exerted on the high range gear 6a and/or on the synchronizer 7 during engagement of the high range gear 6a. In the embodiment shown in FIG. 3 $|T_{sync}| \geq |T_{dis}|$ and $|T_{sync}| \geq |T_{eng}|$ in order to speed up synchronization of the motor speed $\omega_{mot}$ with the target speed $\omega_{tar}=\gamma_a \cdot \omega_{out}$. It is understood that in alternative embodiments $\oplus T_{sync}|$ may be chosen such that $|T_{sync}| \leq |T_{eng}|$, for example in order to guarantee a maximally smooth engagement of the high range gear 6a once the motor speed $\omega_{mot}$ and the target speed $\omega_{tar}=\gamma_a \cdot \omega_{out}$ have been synchronized.

At time $t_5$ ($t_5 > t_4$) the synchronizer 7 including the hydraulic actuator 8d starts engaging the high range gear 6a with the output shaft 6. Time $t_5$ marks the end of the synchronization phase 16 and the beginning of an engagement phase 17. Throughout the engagement phase 17 the motor torque is limited to $|T_{mot}| \leq |T_{eng}|$.

At time $t_6$ ($t_6 > t_5$) the synchronizer 7 has completed engagement of the high range gear 6a with the output shaft 6 so that the high range gear 6a is locked to the output shaft 6 and rotates with the output shaft 6. The gear ratio between the motor 2 and the output shaft 6 is now given by $\gamma_a$.

The following is a description of the method steps carried out during the downshift from the high range gear 6a to the low range gear 6b depicted in FIG. 4.

At time $t_0$ the valve 8c is switched to the control position A and the synchronizer 7 locks the high range gear 6a to the output shaft 6 so that the high range gear 6a rotates with the output shaft 6. The gear ratio between the motor 2 and the output shaft 6 is given by $\gamma_a$. The low range gear 6b is free to rotate relative to the output shaft 6. The motor 2 turns at motor speed $\omega_{mot,a}$.

At time $t_1$ ($t_1 > t_0$) the controller 4 initiates the downshift from the high range gear 6a to the low range gear 6b by switching the control valve 8c to the control position B, thereby causing the synchronizer 7 including the actuator 8d to gradually disengage the high range gear 6a. Time $t_1$ marks the beginning of the disengagement phase 15. The controller 4 may initiate the downshift at time $t_1$ based on at least one of an input command provided by an operator, a current motor speed and a current motor torque, for example. At the beginning of the disengagement phase 15 at time $t_1$ the controller 4 further sets the motor torque limit 14 to an upper limit of $T_{dis}$, thereby limiting the torque exerted by the motor 2 to values $T_{mot} \leq T_{dis}$ or $|T_{mot}| \leq |T_{dis}|$. Again, $|T_{dis}|$ may be the maximum torque the motor 2 may exert during disengagement of the high range gear 6a without causing a torque or stress exerted on the high range gear 6a and/or on the synchronizer 7 to exceed a predetermined threshold torque, thereby minimizing wear and guaranteeing a smooth disengagement of the high range gear 6a. Preferably, $|T_{dis}|$ is non-zero, and the controller 4 may control the electric drive motor 2 to provide a non-zero torque $|T_{mot}| > 0$ during the disengagement phase or throughout the disengagement phase.

During the disengagement phase 15 the controller 4 determines an updated value of the motor speed setpoint 13, also termed target speed $\omega_{tar}$, based on a current speed $\omega_{out}$ of the output shaft 6 measured by the speed sensor 10 and based on the gear ratio $\gamma_b$ provided by the low range gear 6b after completion of the downshift to the low range gear 6b. Specifically, the target speed determined by the controller 4 is given by $\omega_{tar}=\gamma_b \cdot \omega_{out}$. At this time the controller 4 starts synchronizing the motor speed $\omega_{mot}$ with the previously calculated target speed $\omega_{tar}=\gamma_b \cdot \omega_{out}$ by actively controlling the motor torque $T_{mot}$.

At time $t_2$ ($t_2 > t_1$) the synchronizer 7 has fully disengaged the high range gear 6a from the output shaft 6. Time $t_2$ marks the beginning of the synchronization phase 16. At time $t_2$ the motor speed starts changing. During the synchronization phase 16 both the high range gear 6a and the low range gear 6b are disengaged from the output shaft 6 and free to rotate relative to the output shaft 6. At the beginning of the synchronization phase 16 at time $t_2$ the motor speed $\omega_{mot}$ starts to vary towards the previously calculated target speed $\omega_{tar} = \gamma_b \cdot \omega_{out}$ under the action of the synchronizer friction torque and of the motor torque, thereby speeding up the synchronization process and reducing wear of the synchronizer 7 and/or of the of low range gear 6b. The controller 4 may be configured to continuously update the value of the target speed $\omega_{tar} = \gamma_b \cdot \omega_{out}$ during the synchronization phase based on continuous measurements of the speed $\omega_{out}$ of the output shaft 6 using the speed sensor 10.

During the synchronization phase 16 the controller 4 controls the motor 2 to exert or apply a non-zero torque on the input shaft 5, in particular a positive torque, resulting in an acceleration of the motor 2. Or in other words, during the synchronization phase 16 the controller 4 controls the motor 2 to decrease the absolute value of the difference between the motor speed $\omega_{mot}$ and the target speed $\omega_{tar} = \gamma_b \cdot \omega_{out}$. The controller 4 may synchronize the motor speed $\omega_{mot}$ with the target speed $\omega_{tar} = \gamma_b \cdot \omega_{out}$ using open loop control or closed loop (feedback) control, for example.

At time $t_3$ ($t_3 > t_2$) the controller 4 determines that $|\omega_{mot} - \omega_{out} \gamma_a| > d_3$, indicating that the high range gear 6a has been disengaged from the output shaft 6. $d_3$ may be a predetermined threshold value, for example. At time $t_3$ the controller 4 then sets the motor torque limit 14 to an upper limit of $T_{sync}$, thereby limiting the torque exerted by the motor 2 to values $T_{mot} \leq T_{sync}$ or $|T_{mot}| \leq |T_{sync}|$. Preferably, $|T_{sync}| > 0$. Limiting the motor torque during the synchronization phase 16 may reduce a torque or stress exerted on the low range gear 6b and/or on the synchronizer 7 when the synchronizer 7 starts engaging the low range gear 6b.

At time $t_4$ ($t_4 > t_3$) the controller 4 determines that $|\omega_{mot} - \omega_{out} \gamma_b| < d_4$, indicating that the motor speed $\omega_{mot}$ has been synchronized with the target speed $\omega_{tar} = \gamma_b \cdot \omega_{out}$ and that the synchronizer 7 including the hydraulic actuator 8d is about to engage the low range gear 6b with the output shaft 6. $d_4$ may be a predetermined threshold value, for example. At time $t_4$ the controller 4 then sets the motor torque limit 14 to an upper limit of $T_{eng}$, thereby limiting the torque exerted by the motor 2 to values $T_{mot} \leq T_{eng}$ or $|T_{mot}| \leq |T_{eng}|$. Preferably, $|T_{eng}|$ is non-zero, i. e. $|T_{eng}| > 0$, and the controller 4 may control the electric drive motor 2 to provide a non-zero torque during the engagement phase or throughout the engagement phase. Limiting the motor torque before the synchronizer 7 starts engaging the low range gear 6b with the output shaft 6 may reduce a torque or stress exerted on the low range gear 6b and/or on the synchronizer 7 during engagement of the low range gear 6b. In the embodiment shown in FIG. 4 $|T_{sync}| \geq |T_{dis}|$ and $|T_{sync}| \geq |T_{eng}|$ in order to speed up synchronization of the motor speed $\omega_{mot}$ with the target speed $\omega_{tar} = \gamma_b \cdot \omega_{out}$. It is understood that in alternative embodiments $|T_{sync}|$ may be chosen such that $|T_{sync}| \leq |T_{eng}|$, for example in order to guarantee a maximally smooth engagement of the low range gear 6b once the motor speed $\omega_{mot}$ and the target speed $\omega_{tar} = \gamma_b \cdot \omega_{out}$ have been synchronized.

At time $t_5$ ($t_5 > t_4$) the synchronizer 7 including the hydraulic actuator 8d starts engaging the low range gear 6b with the output shaft 6. Time $t_5$ marks the end of the synchronization phase 16 and the beginning of an engagement phase 17. Throughout the engagement phase 17 the motor torque is limited to $|T_{mot}| \leq |T_{eng}|$.

At time $t_6$ ($t_6 > t_5$) the synchronizer 7 has completed engagement of the low range gear 6b with the output shaft 6 so that the low range gear 6b is locked to the output shaft 6 and rotates with the output shaft 6. The gear ratio between the motor 2 and the output shaft 6 is now given by $\gamma_b$.

Although identical symbols have been used to designate the times $t_1$-$t_6$ and the torque limit values $T_{dis}$, $T_{sync}$ and $T_{eng}$ for both the upshift illustrated in FIG. 3 and the downshift illustrated in FIG. 4, it should be noted that the values these quantities assume during an upshift may be different from the values these quantities assume during a downshift.

Inter alia, the present disclosure may relate to the following aspects:

1. Electric driveline (1), comprising:
    an electric drive motor (2); and
    a transmission (3), the transmission (3) comprising:
       an output shaft (6), and
    a hydraulically actuatable synchronizer (7) for selectively drivingly engaging the electric drive motor (2) with the output shaft (6) via one of a first gear providing a first gear ratio $\gamma_1$ between the electric drive motor (2) and the output shaft (6) and a second gear providing a second gear ratio $\gamma_2$ between the electric drive motor (2) and the output shaft (6); and
    an electronic shift controller (4) for controlling a gear shift from the first gear to the second gear;
    wherein the electronic shift controller (4) is configured to:
    actuate the synchronizer (7) to disengage the first gear and to engage the second gear, and synchronize a motor speed of the electric drive motor (2) with a target speed.
2. The electric driveline (1) of aspect 1, wherein the hydraulically actuatable synchronizer (7) comprises a hydraulic actuator (8d) and a control valve (8c) for controlling the hydraulic actuator (8d), wherein the electronic shift controller (4) is configured to actuate the synchronizer (7) to disengage the first gear and/or to engage the second gear by changing a control position of the control valve (8c).
3. The electric driveline (1) of any one of the preceding aspects, wherein the electronic shift controller (4) is configured to determine the target speed based on an output shaft speed and based on the second gear ratio $\gamma_2$.
4. The electric driveline (1) of any one of the preceding aspects, wherein the electronic shift controller (4) is configured to limit an absolute value $|T_{mot}|$ of a torque provided by the electric drive motor (2) during disengagement of the first gear to a first maximum torque $|T_{dis}|$ until the first gear is disengaged, so that $|T_{mot}| \leq |T_{dis}|$ during disengagement of the first gear, wherein the first maximum torque $|T_{dis}|$ is the maximum torque that allows disengagement of the first gear.
5. The electric driveline (1) of aspect 4, wherein in order to minimize a time required for synchronizing the motor speed with the target speed the electronic shift controller (4) is configured to set the absolute value $|T_{mot}|$ of the torque provided by the electric drive motor (2) during disengagement of the first gear to the maximum torque $|T_{dis}|$ until the first gear is disengaged, so that $|T_{mot}| = |T_{dis}|$ during disengagement of the first gear.
6. The electric driveline (1) of any one of the preceding aspects, wherein the electronic shift controller (4) is configured to limit an absolute value $|T_{mot}|$ of a torque provided by the electric drive motor (2) during synchronization of the motor speed with the target speed to a second maximum torque $|T_{sync}|$ until the motor speed has been synchronized with the target speed, so that $|T_{mot}| \leq |T_{sync}|$ during synchronization of the motor speed with the target speed.

7. The electric driveline (1) of any one of the preceding aspects, wherein the electronic shift controller (4) is configured to limit an absolute value $|T_{mot}|$ of a torque provided by the electric drive motor (2) during engagement of the second gear to a third maximum torque $|T_{eng}|$ until the second gear is engaged, so that $|T_{mot}| \leq |T_{eng}|$ during engagement of the second gear, wherein the third maximum torque $|T_{eng}|$ is the maximum torque that allows engagement of the second gear.

8. The electric driveline (1) of any one of aspects 6 and 7, wherein the electronic shift controller (4) is configured to determine a point in time at which the limitation of the absolute value $|T_{mot}|$ of the torque provided by the electric drive motor (2) to the second maximum torque $|T_{sync}|$ is initiated based on the motor speed and based on an output shaft speed; and/or
wherein the electronic shift controller (4) is configured to determine a point in time at which the limitation of the absolute value $|T_{mot}|$ of the torque provided by the electric drive motor (2) to the third maximum torque $|T_{eng}|$ is initiated based on the motor speed and based on an output shaft speed.

9. The electric driveline (1) of any one of the preceding aspects, wherein the transmission (3) further comprises an input shaft (5), wherein the input shaft (5) is drivingly engaged with the electric drive motor (2) and selectively drivingly engaged with the output shaft (6) via one of the first gear and the second gear, and wherein when the electric drive motor (2) is drivingly engaged with the output shaft (6) the gear ratio γ between the electric drive motor (2) and the output shaft (6) is given by $\gamma = \omega_{mot}/\omega_{out}$, wherein $\omega_{mot}$ is the rotational speed of the electric drive motor (2) and wherein $\omega_{out}$ is the rotational speed of the output shaft (6);
wherein $\gamma_1 > \gamma_2$ (upshift) and wherein the electronic shift controller (4) is configured to synchronize the motor speed with the target speed by controlling the electric drive motor (2) to exert a negative torque on the input shaft (5) to decelerate the motor speed.

10. The electric driveline (1) of any one of aspects 1 to 8, wherein the transmission (3) further comprises an input shaft (5), wherein the input shaft (5) is drivingly engaged with the electric drive motor (2) and selectively drivingly engaged with the output shaft (6) via one of the first gear and the second gear, and wherein when the electric drive motor (2) is drivingly engaged with the output shaft (6) the gear ratio γ between the electric drive motor (2) and the output shaft (6) is given by $\gamma = \omega_{mot}/\omega_{out}$, wherein $\omega_{mot}$ is the rotational speed of the electric drive motor (2) and wherein $\omega_{out}$ is the rotational speed of the output shaft (6);
wherein $\gamma_1 < \gamma_2$ (downshift) and wherein the electronic shift controller (4) is configured to synchronize the motor speed with the target speed by controlling the electric drive motor (2) to exert a positive torque on the input shaft (5) to accelerate the motor speed.

11. Method of shifting gears of an electric driveline (1) from a first gear to a second gear, the electric driveline (1) comprising:
an electric drive motor (2); and
a transmission (3), the transmission (3) comprising:
an output shaft (6), and
a hydraulically actuatable synchronizer (7) for selectively drivingly engaging the electric drive motor (2) with the output shaft (6) via one of a first gear providing a first gear ratio $\gamma_1$ between the electric drive motor (2) and the output shaft (6) and a second gear providing a second gear ratio $\gamma_2$ between the electric drive motor (2) and the output shaft (6);
the method comprising the steps of:
actuating the synchronizer (7) to disengage the first gear and to engage the second gear, and
synchronizing a motor speed of the electric drive motor (2) with a target speed.

12. The method of aspect, further including at least one of:
(i) during the step of disengaging the first gear, limiting an absolute value $|T_{mot}|$ of a torque provided by the electric drive motor (2) to a first maximum torque $|T_{dis}|$ until the first gear is disengaged, so that $|T_{mot}| \leq |T_{dis}|$ during disengagement of the first gear, wherein the first maximum torque $|T_{dis}|$ is the maximum torque that allows disengagement of the first gear;
(ii) during the step of synchronizing the motor speed with the target speed, limiting an absolute value $|T_{mot}|$ of a torque provided by the electric drive motor (2) to a second maximum torque $|T_{sync}|$ until the motor speed has been synchronized with the target speed, so that $|T_{mot}| \leq |T_{sync}|$ during synchronization of the motor speed with the target speed; and
(iii) during the step of engaging the second gear, limiting an absolute value $|T_{mot}|$ of a torque provided by the electric drive motor (2) to a third maximum torque $|T_{eng}|$ until the second gear is engaged, so that $|T_{mot}| \leq |T_{eng}|$ during engagement of the second gear, wherein the third maximum torque $|T_{eng}|$ is the maximum torque that allows engagement of the second gear.

13. The method of aspect 12, wherein the step of limiting the absolute value $|T_{mot}|$ of the torque provided by the electric drive motor (2) to the first maximum torque $|T_{dis}|$ includes setting the absolute value $|T_{mot}|$ of the torque provided by the electric drive motor (2) to the maximum torque $|T_{dis}|$ until the first gear is disengaged, so that $|T_{mot}| = |T_{dis}|$ during disengagement of the first gear.

14. The method of any one of aspects 11-13, wherein the transmission (3) further comprises an input shaft (5), wherein the input shaft (5) is drivingly engaged with the electric drive motor (2) and selectively drivingly engaged with the output shaft (6) via one of the first gear and the second gear, and wherein when the electric drive motor (2) is drivingly engaged with the output shaft (6) the gear ratio γ between the electric drive motor (2) and the output shaft (6) is given by $\gamma = \omega_{mot}/\omega_{out}$, wherein $\omega_{mot}$ is the rotational speed of the electric drive motor (2) and wherein $\omega_{out}$ is the rotational speed of the output shaft (6);
wherein $\gamma_1 > \gamma_2$ (upshift) and wherein the step of synchronizing the motor speed with the target speed includes controlling the electric drive motor (2) to exert a negative torque on the input shaft (5) to decelerate the motor speed.

15. The method of any one of aspects 11-13, wherein the transmission (3) further comprises an input shaft (5), wherein the input shaft (5) is drivingly engaged with the electric drive motor (2) and selectively drivingly engaged with the output shaft (6) via one of the first gear and the second gear, and wherein when the electric drive motor (2) is drivingly engaged with the output shaft (6) the gear ratio γ between the electric drive motor (2) and the output shaft (6) is given by $\gamma = \omega_{mot}/\omega_{out}$, wherein $\omega_{mot}$ is the rotational speed of the electric drive motor (2) and wherein $\omega_{out}$ is the rotational speed of the output shaft (6);

wherein $\gamma_1 < \gamma_2$ (downshift) and wherein the step of synchronizing the motor speed with the target speed includes controlling the electric drive motor (2) to exert a positive torque on the input shaft (5) to accelerate the motor speed.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. An electric driveline, comprising:
an electric drive motor; and
a transmission, the transmission comprising:
an output shaft, and
a synchronizer for selectively drivingly engaging the electric drive motor with the output shaft via one of a first gear providing a first gear ratio $\gamma_1$ between the electric drive motor and the output shaft and a second gear providing a second gear ratio $\gamma_2$ between the electric drive motor and the output shaft; and
an electronic shift controller for controlling a gear shift from the first gear to the second gear;
wherein the electronic shift controller is configured to:
actuate the synchronizer to disengage the first gear and to engage the second gear, and
synchronize a motor speed of the electric drive motor with a target speed;
wherein the electronic shift controller is configured to control the electric drive motor to provide a non-zero torque $|T_{mot}| > 0$ during disengagement of the first gear; and
wherein the electronic shift controller is configured to limit an absolute value $|T_{mot}|$ of the non-zero torque provided by the electric drive motor during disengagement of the first gear to a first maximum torque $|T_{mot}| > 0$ until the first gear is disengaged, so that $|T_{mot}| \leq |T_{dis}|$ during disengagement of the first gear, wherein the first maximum torque $|T_{dis}|$ is the maximum torque that allows disengagement of the first gear.

2. The electric driveline of claim 1, wherein the synchronizer is hydraulically actuatable and comprises a hydraulic actuator and a control valve for controlling the hydraulic actuator, wherein the electronic shift controller is configured to actuate the synchronizer to disengage the first gear and/or to engage the second gear by changing a control position of the control valve.

3. The electric driveline of claim 1, wherein in order to minimize a time required for synchronizing the motor speed with the target speed the electronic shift controller is configured to set the absolute value $|T_{mot}|$ of the torque provided by the electric drive motor during disengagement of the first gear to the maximum torque $|T_{dis}|$ until the first gear is disengaged, so that $|T_{mot}| = |T_{dis}| > 0$ during disengagement of the first gear.

4. The electric driveline of claim 1, wherein the electronic shift controller is configured to control the electric drive motor to provide a non-zero torque $|T_{mot}| > 0$ during synchronization of the motor speed with the target speed.

5. The electric driveline of claim 4, wherein the electronic shift controller is configured to limit an absolute value $|T_{mot}|$ of the non-zero torque provided by the electric drive motor during synchronization of the motor speed with the target speed to a second maximum torque $|T_{sync}| > 0$ until the motor speed has been synchronized with the target speed, so that $|T_{mot}| \leq |T_{sync}|$ during synchronization of the motor speed with the target speed.

6. The electric driveline of claim 5, wherein the electronic shift controller is configured to determine a point in time at which the limitation of the absolute value $|T_{mot}|$ of the torque provided by the electric drive motor to the second maximum torque $|T_{sync}|$ is initiated based on the motor speed and based on an output shaft speed.

7. The electric driveline of claim 6, wherein the electronic shift controller is configured to limit the absolute value $|T_{mot}|$ of the non-zero torque provided by the electric drive motor to the second maximum torque $|T_{sync}|$ when or once $|\omega_{mot} - \omega_{out} \cdot \gamma_1| > d_1$, wherein $\omega_{mot}$ is a rotational speed of the electric drive motor, $\omega_{out}$ is a rotational speed of the output shaft, and $d_1 > 0$ is a first predetermined threshold value.

8. The electric driveline of claim 1, wherein the electronic shift controller is configured to control the electric drive motor to provide a non-zero torque $|T_{mot}| > 0$ during engagement of the second gear.

9. The electric driveline of claim 8, wherein the electronic shift controller is configured to limit an absolute value $|T_{mot}|$ of the non-zero torque provided by the electric drive motor during engagement of the second gear to a third maximum torque $|T_{eng}| > 0$ until the second gear is engaged, so that $|T_{mot}| \leq |T_{eng}|$ during engagement of the second gear, wherein the third maximum torque $|T_{eng}|$ is the maximum torque that allows engagement of the second gear.

10. The electric driveline of claim 9, wherein the electronic shift controller is configured to determine a point in time at which the limitation of the absolute value $|T_{mot}|$ of the non-zero torque provided by the electric drive motor to the third maximum torque $|T_{eng}|$ is initiated based on the motor speed and based on an output shaft speed.

11. The electric driveline of claim 10, wherein the electronic shift controller is configured to limit the absolute value $|T_{mot}|$ of the non-zero torque provided by the electric drive motor to the third maximum torque $|T_{eng}|$ when or once $|\omega_{mot} - \omega_{out} \cdot \gamma_2| < d_2$, wherein $\omega_{mot}$ is the rotational speed of the electric drive motor, $\omega_{out}$ is the rotational speed of the output shaft, and $d_2 > 0$ is a second predetermined threshold value.

12. A method of shifting gears of an electric driveline from a first gear to a second gear, the electric driveline comprising:

an electric drive motor; and
a transmission, the transmission comprising:
  an output shaft, and
  a synchronizer for selectively drivingly engaging the electric drive motor with the output shaft via one of the first gear providing a first gear ratio $\gamma_1$ between the electric drive motor and the output shaft and the second gear providing a second gear ratio $\gamma_2$ between the electric drive motor and the output shaft;

the method comprising the steps of:
  actuating the synchronizer to disengage the first gear and to engage the second gear, and
  synchronizing a motor speed of the electric drive motor with a target speed, wherein the method includes at least one of:
  (i) during the step of disengaging the first gear, controlling the electric drive motor to provide a non-zero torque while limiting an absolute value $|T_{mot}|$ of the non-zero torque provided by the electric drive motor to a first maximum torque $|T_{dis}|>0$ until the first gear is disengaged, so that $|T_{mot}|\leq|T_{dis}|$ during disengagement of the first gear, wherein the first maximum torque $|T_{dis}|$ is the maximum torque that allows disengagement of the first gear;
  (ii) during the step of synchronizing the motor speed with the target speed, controlling the electric drive motor to provide a non-zero torque while limiting an absolute value $|T_{mot}|$ of the non-zero torque provided by the electric drive motor to a second maximum torque $|T_{sync}|>0$ until the motor speed has been synchronized with the target speed, so that $|T_{mot}|\leq|T_{sync}|$ during synchronization of the motor speed with the target speed; and
  (iii) during the step of engaging the second gear, controlling the electric drive motor to provide a non-zero torque while limiting an absolute value $|T_{mot}|$ of the non-zero torque provided by the electric drive motor to a third maximum torque $|T_{eng}|>0$ until the second gear is engaged, so that $|T_{mot}|\leq|T_{eng}|$ during engagement of the second gear, wherein the third maximum torque $|T_{eng}|$ is the maximum torque that allows engagement of the second gear.

13. An electric driveline, comprising:
an electric drive motor; and
a transmission, the transmission comprising:
  an output shaft, and
  a synchronizer for selectively drivingly engaging the electric drive motor with the output shaft via one of a first gear providing a first gear ratio $\gamma_1$ between the electric drive motor and the output shaft and a second gear providing a second gear ratio $\gamma_2$ between the electric drive motor and the output shaft; and
an electronic shift controller for controlling a gear shift from the first gear to the second gear;
wherein the electronic shift controller is configured to:
  actuate the synchronizer to disengage the first gear and to engage the second gear, and
  synchronize a motor speed of the electric drive motor with a target speed;
wherein the electronic shift controller is configured to control the electric drive motor to provide a non-zero torque $|T_{mot}|>0$ during synchronization of the motor speed with the target speed; and
wherein the electronic shift controller is configured to limit an absolute value $|T_{mot}|$ of the non-zero torque provided by the electric drive motor during synchronization of the motor speed with the target speed to a second maximum torque $|T_{sync}|>0$ until the motor speed has been synchronized with the target speed, so that $|T_{mot}|\leq|T_{sync}|$ during synchronization of the motor speed with the target speed.

14. The driveline of claim 13, wherein the synchronizer is adapted to selectively drivingly engage the electric drive motor with the output shaft via one of the first gear providing a first gear ratio $\gamma_1$ between the electric drive motor and the output shaft and the second gear providing a second gear ratio $\gamma_2$ between the electric drive motor and the output shaft.

15. The driveline of claim 13, wherein the electronic shift controller is configured to control the electric drive motor to provide a non-zero torque $|T_{mot}|>0$ during disengagement of the first gear.

16. The driveline of claim 13, wherein the electronic shift controller is configured to control the electric drive motor to provide a non-zero torque $|T_{mot}|>0$ during engagement of the second gear.

* * * * *